UNITED STATES PATENT OFFICE.

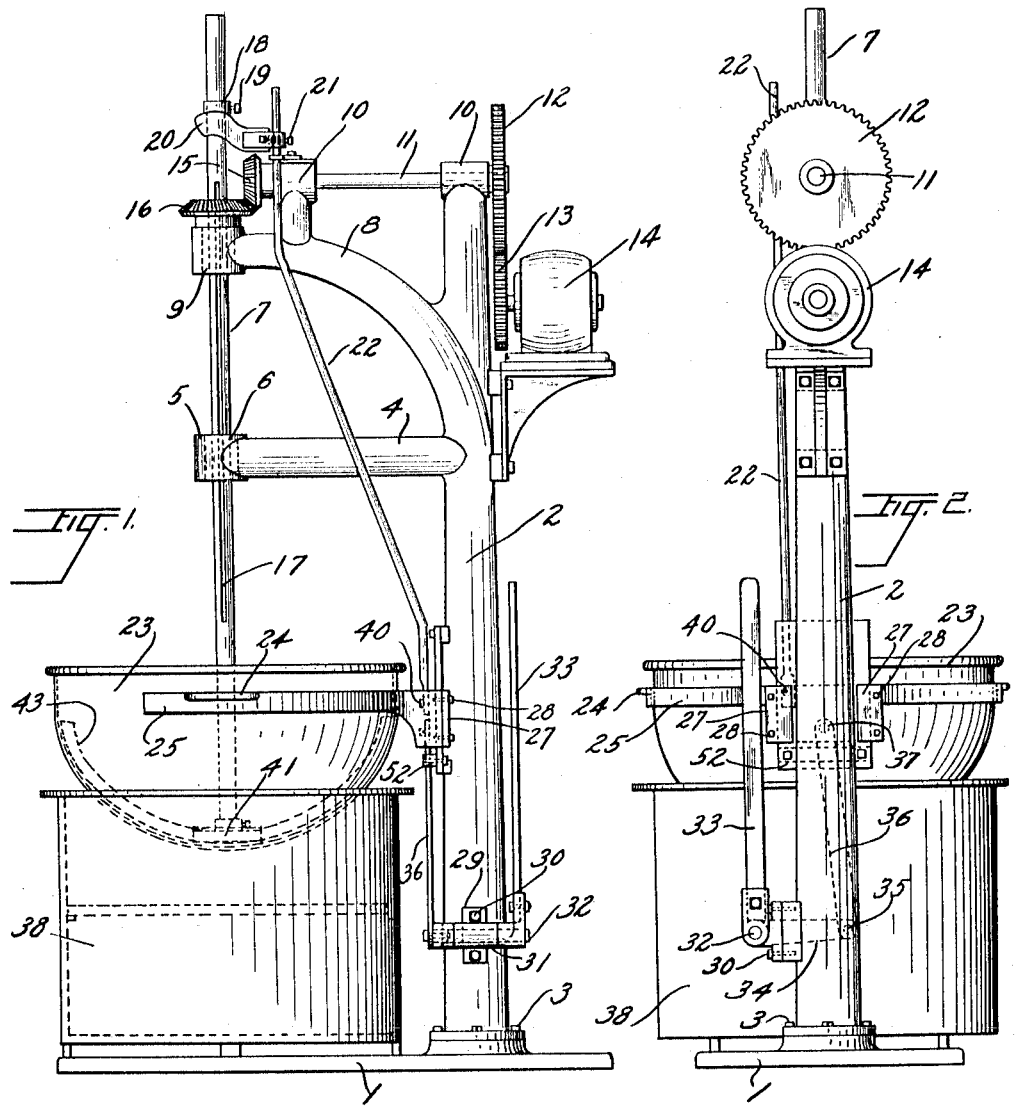

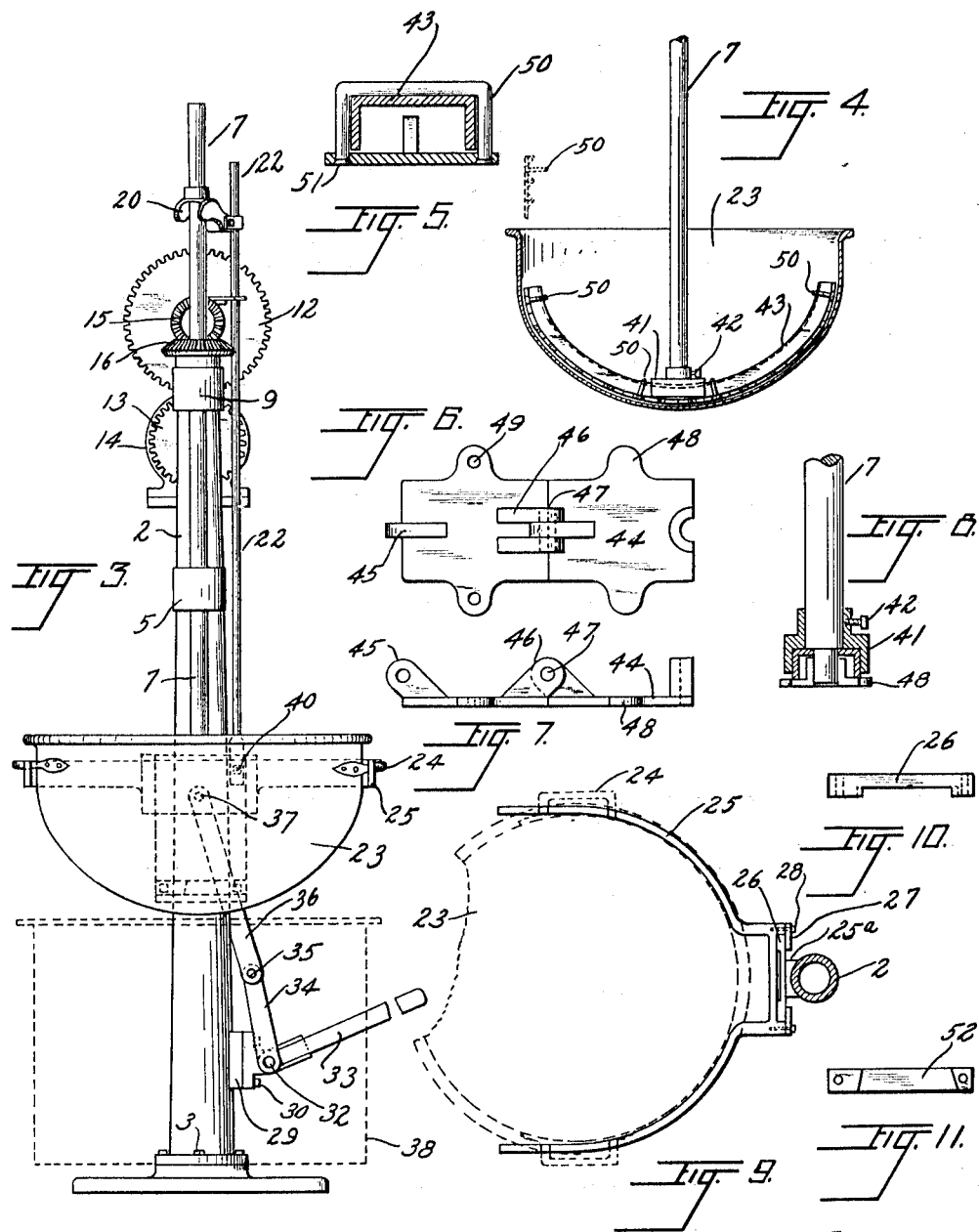

RICHARD J. SAVAGE AND CHARLES E. SCHULTZ, OF CHICAGO, ILLINOIS.

CANDY-MAKING MACHINE.

1,040,427. Specification of Letters Patent. Patented Oct. 8, 1912.

Application filed March 4, 1912. Serial No. 681,523.

*To all whom it may concern:*

Be it known that we, RICHARD J. SAVAGE and CHARLES E. SCHULTZ, both citizens of the United States, and residing at Chicago, Illinois, have invented certain new and useful Improvements in Candy-Making Machines, of which the following is a specification.

The primary objects of the invention are to provide means whereby the kettle containing the candy which is being cooked can be quickly lifted away from the fire or flame and moved to a point where the contents will no longer cook, in a very short space of time; and, also, to provide new and improved means for scraping the bottom of the kettle while the cooking process is progressing.

In the drawings forming part of this specification, in which like reference numerals denote like parts throughout the several views, Figure 1 is a side elevation of the machine showing the kettle in lowered position; Fig. 2 is an elevation similar to Fig. 1 at an angle of 90 degrees to the view of Fig. 1 looking toward the left in said figure; Fig. 3 is an elevation looking toward the right in Fig. 1; Fig. 4 is a sectional view showing the interior of the kettle; Fig. 5 is a detailed sectional view of part of the stirring mechanism; Fig. 6 is a top plan view; and Fig. 7 is a side view of part of the stirring mechanism; Fig. 8 is a view partly in elevation and partly in section showing the connection between the stirrer and the shaft; Fig. 9 is a top plan view showing the wish-bone or device for supporting the kettle; and Figs. 10 and 11 are detailed views of some of the parts of the mechanism.

The base 1 is adapted to be secured upon the floor and to said base the post 2 is secured by bolts 3. The arm 4 is secured to the post and is provided at its outer extremity with the head 5, which is perforated at 6, the shaft 7 being adapted to rotate within said perforation 6 as a bearing. The post 2 also carries an arm 8 which provides a bearing 9 for said shaft 7.

Carried upon a bearing 10 supported upon the post 2 is a shaft 11 which carries a gear 12 at one end, which gear meshes with and is driven by another gear 13 fixed upon the shaft of the motor 14. The shaft 11 may, however, be driven by a belt or any other suitable source of power. At its inner end shaft 11 carries a beveled gear 15 which meshes with and drives the beveled gear 16, which beveled gear 16 is rotatable in the head 9. Gear 16 carries a vertical feather (not shown) adapted to be received within the spline 17 on the shaft 7. Adjacent its upper end the shaft 7 carries a collar 18 which is fastened to the shaft 7 by the set-screw 19, and said collar 18 limits the downward movement of shaft 7 by engaging the bifurcated yoke 20. Said yoke 20 is secured by bolts 21 to the rod 22.

The kettle 23 is provided with handles 24 by which the kettle may be lifted or carried to any desired position or retained within the wish-bone or yoke 25. To the post 2 the blocks 25ª are bolted and a strap or guide 26 extends vertically along the side of the post 2. Plates 27 are secured by bolts 28 to the wish-bone 25 so as to lock the same to the strap 26, and thus the wish-bone 25 is permitted to have a rising and falling movement but is retained upon the post.

The bracket 29 is secured by bolts 30 to post 2 and bears a hub 31 through which the shaft 32 passes. On one end of said shaft is fixed the lever 33 and at the other end is the crank-arm 34. The pivot or pin 35 connects the link 36 to the crank-arm 34. At its upper end the link 36 is connected by pin 37 to the wish-bone 25 which connects the two arms of the wish-bone. The fire by which the material contained within the kettle 23 is cooked, is retained within the head 38, said fire being either a coal, coke, or gas fire as may be desired.

When the parts are shown in the position indicated in Figs. 1 and 2, kettle 23 is allowed to be in its lowermost position and as near to the fire as possible; but if the lever 33 be moved toward the left, Fig. 2, and to the position shown in Fig. 3, the crank-arm 34 and the link 36 act as a pair of toggle arms and quickly raise the kettle away from the fire, lifting the same to the position shown in Fig. 3. At the same time that the kettle is being lifted the rod 22 and the bracket 20 carried thereby were also raised, since said rod 22 is fastened at 40 to the wish-bone 25, and the shaft 7 and connected parts are given a rising and falling movement corresponding with the raising or lowering of the kettle 23. The gear 16 and the driving mechanism are not raised and lowered, but because of the spline and feather connection between gear 16 and shaft 7, the shaft will continue to revolve as long as the motor is in operation, regardless of the position of the kettle 23. The kettle can thus be removed very quickly from the fire while the stirring apparatus is still in motion.

At the bottom of the shaft 7 block 41 is secured by set-screw 42. To the block 41 the channel irons 43 are secured, said channel irons being bent so as to conform to the shape of the bottom of the kettle, and project radially from the shaft 7. A chain composed of links 44 is provided, each of said links being a flat piece of metal provided at one end with a single stud 45, and at the other end with a pair of studs 46, adjacent studs 45 and 46 being connected by pin 47. The links 44 are also provided with outwardly-extending ears 48 which may be perforated at 49, while staple 50 can be secured to a link by screws 51 which pass through perforations 49. Enough links are used to form a chain of substantially the same length as the channel iron 43, in connection with which said chain is to be used, and each of the end links is provided with a staple 50. As clearly shown in Figs. 4 and 5, each staple 50 passes over the outside of the channel iron and holds the chain to and beneath the channel iron.

The object of the channel iron 43 and the chain connected therewith is to provide means for scraping the bottom of the kettle and to prevent the sugar or other substances which are being cooked from burning or from adhering to the bottom of the kettle. Inasmuch as the kettles are usually made by hand and sometimes become dented from use, and even when new present certain irregularities in shape, it would not be feasible to scrape the bottom of the kettle directly with the rigid channel iron 43 or any other non-yielding scraper, but it is obvious that the chains composed of the links 44 will have a slight rising and falling movement within the channel irons and will accommodate themselves to various irregularities in the surface of the kettle 23, and will at all times rest upon and scrape the surface or bottom of the kettle, whereas, were the rigid and inflexible channel iron used as a scraper, it would be found that even though the iron should engage the surface of the kettle at one point, it would pass out of engagement at another point because of the inevitable irregularities in the shape of the kettle; whereas, when the chain is used same always remains in engagement with the kettle.

When it is desired to clean the scraper, all that is necessary to be done is to pull the chain off the channel iron and either wash the chain or replace it by a new and clean chain, this being readily done by merely causing the staples 50 to pass over the end of the channel iron and allowing the chain to slip or fall into position as shown in full lines in Fig. 4 of the drawings.

It will be evident that the shaft 7 may rotate in either direction desired or it may be rotated first in one direction and then in the other direction without affecting the operation of the machine, because the chains will scrape the bottom of the kettle regardless of the direction in which or the speed at which the shaft 7 is revolving. The studs 45 and 46 project upwardly into the channel and, as the shaft revolves, catch against the sides of the channel iron and keep the chain from pulling out from beneath the iron.

When the parts are in the position shown in Fig. 3, the pin 35 is carried beyond the line connecting pins 32 and 37. The movement of the link 36 toward the right, Fig. 3, being limited by the notched stop 52, it is obvious that the kettle is locked in upward position when the parts are in the position shown in said figure.

It will be observed that the apparatus for raising the kettle acts very quickly upon the kettle, this being very desirable in any machine used for cooking candy or other articles containing sugar. In this art instantaneous removal of the candy from the fire is often necessary, and it is often desirable to permit the candy to cook until the very instant that it begins to boil, then to stop the cooking and to lift the kettle and its contents away from the heat. As previously stated, however, the raising or lowering of the kettle does not affect the action of the stirring apparatus, so that even though the kettle be lifted away from the fire, its contents may still be stirred, and burning, caking, or granulating of the contents prevented.

Although but one specific embodiment of the invention is shown in the drawings and described in the specification, it is obvious that many changes in details of construction may be made without departing from the scope of the invention of the various claims.

We claim as our invention:

1. A candy-making machine, comprising a kettle, means adapted to support the same above the fire, and operating lever, and toggle arms intermediate said lever and said supporting means, whereby said lever is adapted to raise or lower said kettle.

2. A candy-making machine, comprising a kettle, means supporting the same above the fire, a shaft projecting into the kettle, means extending from said supporting means to said shaft, a lever, and a pair of toggle-arms intermediate said lever and said supporting means, whereby said lever is adapted to raise and lower said kettle and said shaft.

3. A candy-making machine, comprising a kettle, a yoke by which said kettle is supported, a base to which the arms of said yoke are united, a shaft, means intermediate said shaft and connected to said base, whereby rotation of said shaft causes movement of said base, and means for rotating said shaft.

4. A candy-making machine, comprising a kettle, a yoke supporting the same, a base to which the arms of said yoke are united, a guide in connection with which said yoke is adapted to slide, a shaft, toggle arms intermediate said shaft and connected to said base, and means for rocking said shaft.

5. A candy-making machine, comprising a kettle, a yoke supporting the same, a base to which the arms of said yoke are united, a rotating shaft, an arm adapted to raise or lower the same and connected to said kettle-supporting means, and means for reciprocating said kettle-supporting means.

6. A candy-making machine comprising a kettle, a yoke by which said kettle is supported, a rotating shaft, an arm adapted to raise or lower the same, said arm being connected to said kettle-supporting means, an operating lever, and means intermediate said lever and said kettle-supporting means, whereby said lever is adapted to raise or lower said kettle and said rotating shaft.

In testimony whereof we have affixed our names in the presence of two witnesses.

RICHARD J. SAVAGE.
CHARLES E. SCHULTZ.

Witnesses:
ROBT. KLOTZ,
GEO. A. SHAFER.

---

Copies of this patent may be obtained for five cents each, by addressing the "Commissioner of Patents, Washington, D. C."